US010599588B1

(12) United States Patent
Wieland (10) Patent No.: US 10,599,588 B1
(45) Date of Patent: Mar. 24, 2020

(54) INTERCONNECTION OF PERIPHERAL DEVICES ON DIFFERENT ELECTRONIC DEVICES (71) Applicant: OPEN INVENTION NETWORK LLC, Durham, NC (US)

(72) Inventor: Martin Wieland, Munich (DE)

(73) Assignee: OPEN INVENTION NETWORK LLC, Durham, NC (US)

(*) Notice: Subject to any disclaimer, the term of this patent is extended or adjusted under 35 U.S.C. 154(b) by 0 days.

(21) Appl. No.: 15/601,632

(22) Filed: May 22, 2017

Related U.S. Application Data (63) Continuation of application No. 15/290,870, filed on Oct. 11, 2016, now Pat. No. 9,658,970, which is a continuation of application No. 14/968,610, filed on Dec. 14, 2015, now Pat. No. 9,465,624, which is a continuation of application No. 14/595,489, filed on Jan. 13, 2015, now Pat. No. 9,213,668, which is a
(Continued)

(51) Int. Cl.
G06F 13/10 (2006.01)
G06F 9/455 (2018.01)
G06F 9/4401 (2018.01)
G06F 5/06 (2006.01)
G06F 13/42 (2006.01)
G06F 13/38 (2006.01)

(52) U.S. Cl.
CPC ............ *G06F 13/105* (2013.01); *G06F 5/065* (2013.01); *G06F 9/4411* (2013.01); *G06F 9/45504* (2013.01); *G06F 9/45558* (2013.01); *G06F 13/385* (2013.01); *G06F 13/423* (2013.01); *G06F 2009/45579* (2013.01); *G06F 2205/067* (2013.01)

(58) Field of Classification Search
CPC .... G06F 5/065; G06F 9/4411; G06F 9/45504; G06F 9/45558; G06F 13/105; G06F 13/385; G06F 13/423; G06F 2009/45579; G06F 2205/067
See application file for complete search history.

(56) References Cited

U.S. PATENT DOCUMENTS 6,831,908 B2 * 12/2004 Kikuchi .............. H04L 12/5692
370/338
8,544,092 B2 * 9/2013 Hermann ................ G06F 21/57
713/187

(Continued)

OTHER PUBLICATIONS

Axelson, Jan; USB Complete 3rd ed., 2005.*

*Primary Examiner* — Eric T Oberly (57) ABSTRACT

A method and apparatus of performing a data transmission from an electronic device or a peripheral device of an electronic device to a peripheral device of a remote electronic device is disclosed. One example method of performing the data transmission may include transmitting data designated for the remote peripheral device to a local virtual device object. The data that is received by the local virtual device object is transmitted via at least one communication interface or peripheral device of the electronic device to at least one remote communication interface or peripheral device of the remote electronic device. The data arriving at the least one remote communication interface or peripheral device of the remote electronic device is received by a remote virtual device object and transmitted to the designated remote peripheral device.

20 Claims, 5 Drawing Sheets

Related U.S. Application Data continuation of application No. 12/711,440, filed on Feb. 24, 2010, now Pat. No. 8,935,434.

(56) References Cited

U.S. PATENT DOCUMENTS

| | | | | |
|---|---|---|---|---|
| 2005/0138229 A1* | 6/2005 | Sartore | ............... | G06F 13/385 710/15 |
| 2005/0193421 A1* | 9/2005 | Cragun | ............... | H04N 5/247 725/80 |
| 2007/0250649 A1* | 10/2007 | Hickey | ............... | G06F 13/385 710/62 |

* cited by examiner

INTERCONNECTION OF PERIPHERAL DEVICES ON DIFFERENT ELECTRONIC DEVICES

CROSS REFERENCE TO RELATED APPLICATIONS

This application is a continuation of U.S. application Ser. No. 15/290,870, filed Oct. 11, 2016, entitled INTERCONNECTION OF PERIPHERAL DEVICES ON DIFFERENT ELECTRONIC DEVICES, issued as U.S. Pat. No. 9,658,970 on May 23, 2017, which is a continuation of U.S. application Ser. No. 14/968,610, filed Dec. 14, 2015, entitled INTERCONNECTION OF PERIPHERAL DEVICES ON DIFFERENT ELECTRONIC DEVICES, issued as U.S. Pat. No. 9,465,624 on Oct. 11, 2016, which is a continuation of U.S. application Ser. No. 14/595,489, filed Jan. 13, 2015, entitled INTERCONNECTION OF PERIPHERAL DEVICES ON DIFFERENT ELECTRONIC DEVICES, issued as U.S. Pat. No. 9,213,668 on Dec. 15, 2015, which is a continuation of U.S. application Ser. No. 12/711,440, filed Feb. 24, 2010, entitled INTERCONNECTION OF PERIPHERAL DEVICES ON DIFFERENT ELECTRONIC DEVICES, issued as U.S. Pat. No. 8,935,434 on Jan. 13, 2015, the entire contents are hereby incorporated by reference.

TECHNICAL FIELD OF THE INVENTION

The present invention relates generally to the use of peripheral devices and communication interfaces to communicate between electronic devices such as computers and, in particular, to bridging of peripheral devices via transport media that operates at various speeds and communication standards such as synchronous and asynchronous.

BACKGROUND OF THE INVENTION

A computer system is comprised of different components or devices that operate together to form the resultant system. Typical computer devices such as the central processing unit usually are supplied with the computer system initially whereas other devices can be installed into the computer system after the initial configuration of the system. The devices of the computer system are generally coupled together via interconnects which may be of several types, such as system and peripheral bus.

Networks are typically comprised of a variety of different electronic components or devices that are able to identify and communicate with each other by using an addressing and communication scheme that is known by each participant. The network allows computers to communicate with each other and share resources and information. Computer networks are made up of basic hardware building blocks to interconnect network nodes, such as Network Interface Cards, Bridges, Hubs, Switches, and Routers. A network card, network adapter or NIC (network interface card) is a piece of computer hardware designed to allow computers to communicate over a computer network. It provides physical access to a networking medium.

Device drivers are well known in the art. When a device is installed onto a computer by the user, a device driver has to be loaded to enable communication with the device. A device driver is software that is used to describe and control the device for the operating system. A virtual device driver is a specific type of device driver that, like a device driver for a physical existent device, has full access to the operating system kernel and is able to communicate directly to a physical port. In difference to device drivers for existent hardware a virtual device driver is loaded without a hardware device being detected by the system. A virtual device driver manipulates kernel mode code using existing hardware resources to emulate a device that is not present on the computer. A virtual driver is given more access than a traditional device driver because it is not restricted to talking to just one particular device.

Virtual device drivers are designed to handle hardware device contention between multiple processes and to translate or buffer data transfers from a virtual machine to hardware devices. A virtual machine is a self-contained operating environment that behaves as if it were a separate computer. When two or more processes attempt to access the same device, some method of contention management must be used. A virtual device driver allows each process to act as though it has exclusive access to the device. For example, a virtual printer driver would provide the printing process with a virtual printer port, and characters written to the port would be written to a print spooler. The virtual device driver would then send the job to the printer when it becomes available. Another method would be to assign the physical device to only one process at a time, so that when a process attempts to access the device while it is in use, the virtual device driver does not pass the request to the actual hardware, and the process operates as though the hardware did not exist. Virtual device drivers also virtualize input/output to the device and for example a virtual network device driver translates this information into commands to be sent across a network to a hardware server.

A technique that allows error free communication between devices that obligatory require exchange of protocol status information's faster than provided by the underlying network transport is not currently known in the art. However, such a technique would offer significant advantages over the prior art.

A method for bridging multiple network segments and exposing the multiple network segments as a single network to a higher level networking software on a bridging computing device as described in U.S. Pat. No. 7,089,335 is known in the art. However, if this method is used to connect devices that work with a time critical protocol and the transmission speed of the network segments fall under a certain value communication errors occur at the devices.

As disclosed in U.S. Pat. No. 6,968,307 a technique for creation and use of virtual device drivers on a serial bus is already known. Beside the creation of virtual device drivers also an extension of the peripheral bus even over LAN and WAN networks is described. The method emulates the peripheral bus itself with all its typical features and characteristics. This method does not give an acceptable answer to the question how devices can communicate successful if the underlying network media itself does not meet the requirements of the peripheral bus in concern of speed and timing.

An extension of fast peripheral buses like the IEEE 1394 "Firewire" bus over comparatively slow transport media such as wireless networks as disclosed by the IEEE 1394 Trade Association in December 2001 allows error free communication between endpoints of such an extended peripheral bus in terms of bus availability and clock time synchronization. However, a solution for devices that obligatory require the exchange of protocol information's at a speed that is higher than the wireless network is not included.

The IEEE 1394 Trade associations white paper "Networking IEEE 1394 Clusters via UWB over Coaxial Cable"

discloses and covers many parts of communication between devices on a extended peripheral bus inclusive all timing requirements of video and audio devices. However, this disclosure is solely based on using an underlying network technology that is quite as fast as the peripheral bus itself. Slow, dropped out or unavailable networks are not covered by this disclosure.

Virtualization technologies from various manufacturers already allow the creation of additional virtual hardware resources such as network interface card, hard disk and computer system (Guest machine) on a physical existent computer system (Host machine). This technique emulates a machine with its physical properties. By establishing interconnections between the physical devices of the host and the devices of the emulated guest devices of the guest can be attached to similar physical devices of the host. However, devices on peripheral buses of the host machine such as nodes of a serial bus cannot be attached to nodes of the peripheral bus of the guest machine because the peripheral bus of the host is independent of the guest's bus. Even if possible, if the architecture of the guest's operating system fundamentally differs from the host's operating system the attachment of newly added devices on peripheral buses of the host to the guest's peripheral buses most likely fails because the device is announced by the operating system and not the machine.

In Digi International's AnywhereUSB Remote I/O Concentrator documentation another method is disclosed that is applicable for accessing physically existent USB devices on an external hardware device which is attached to a network cable from a remote computer that is also connected to a network. At the remote computer a service is used that connects to the external hardware by using the TCP/IP network transport protocol of the remote computer. Thru the network connection the service establishes a socket connection to the device. A hardware description information of each external USB connector is installed on the local computer. The local serial bus of the computer is extended with these new nodes and makes them part of the local serial bus. By design, this technique extends the local serial bus of the computer to the external device by emulating a wired connection over the network. The external device itself gets a part of the local serial bus. This approach requires that the external device with it's USB connectors can be reached by the network and provides information's about the installed connectors to the local service. If USB connectors are part of another computer's local serial bus or different types of connectors are used this method fails because the computer does not provide information's about the nodes installed on his local serial bus thru the network.

SUMMARY OF THE INVENTION

A peripheral device connected to a local electronic device which is connected to at least one communication network can communicate with a peripheral device attached to a remote electronic device as if the remote peripheral device was locally attached. Data designated for the remote peripheral device is received by a local virtual device object and transmitted to the remote electronic device via at least one of the electronic devices communication interfaces or peripheral devices. Data received by the remote electronic device's communication interface or peripheral device is written to the peripheral device at the remote electronic device by a virtual device object. For compensation of different transfer speeds or outages between the peripheral device and the communication interface or another peripheral device the virtual device provides the ability to utilize the virtual devices emulation driver that is attached to the virtual device object as an I/O buffer. As the invention provides a generic method for virtualization of a remote peripheral device it works independent from specific types of devices and Operating Systems. As the invention works with synchronous and asynchronous communication standards and does not require a specific network transport protocol it can be used with any available communication interface or peripheral device of the electronic device.

One embodiment of the present invention may include a method of data transmission from an electronic device or a peripheral device of an electronic device to a peripheral device of a remote electronic device. The method may include transmitting data designated for the remote peripheral device to a local virtual device object, the data received by the local virtual device object is transmitted via at least one communication interface or peripheral device of the electronic device to at least one remote communication interface or peripheral device of the remote electronic device. The method may also provide that the data arriving at the at least one remote communication interface or peripheral device of the remote electronic device is received by a remote virtual device object and transmitted to the designated remote peripheral device.

Another example embodiment of the present invention may include an apparatus configured transmit data to a peripheral device of a remote electronic device. The apparatus may include a transmitter configured to transmit data designated for the remote peripheral device to a local virtual device object, the data received by the local virtual device object is transmitted via at least one communication interface or peripheral device of the apparatus to at least one remote communication interface or peripheral device of the remote electronic device. The apparatus may also provide that the data received at the least one remote communication interface or peripheral device of the remote electronic device is received by a remote virtual device object and transmitted to the designated remote peripheral device.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
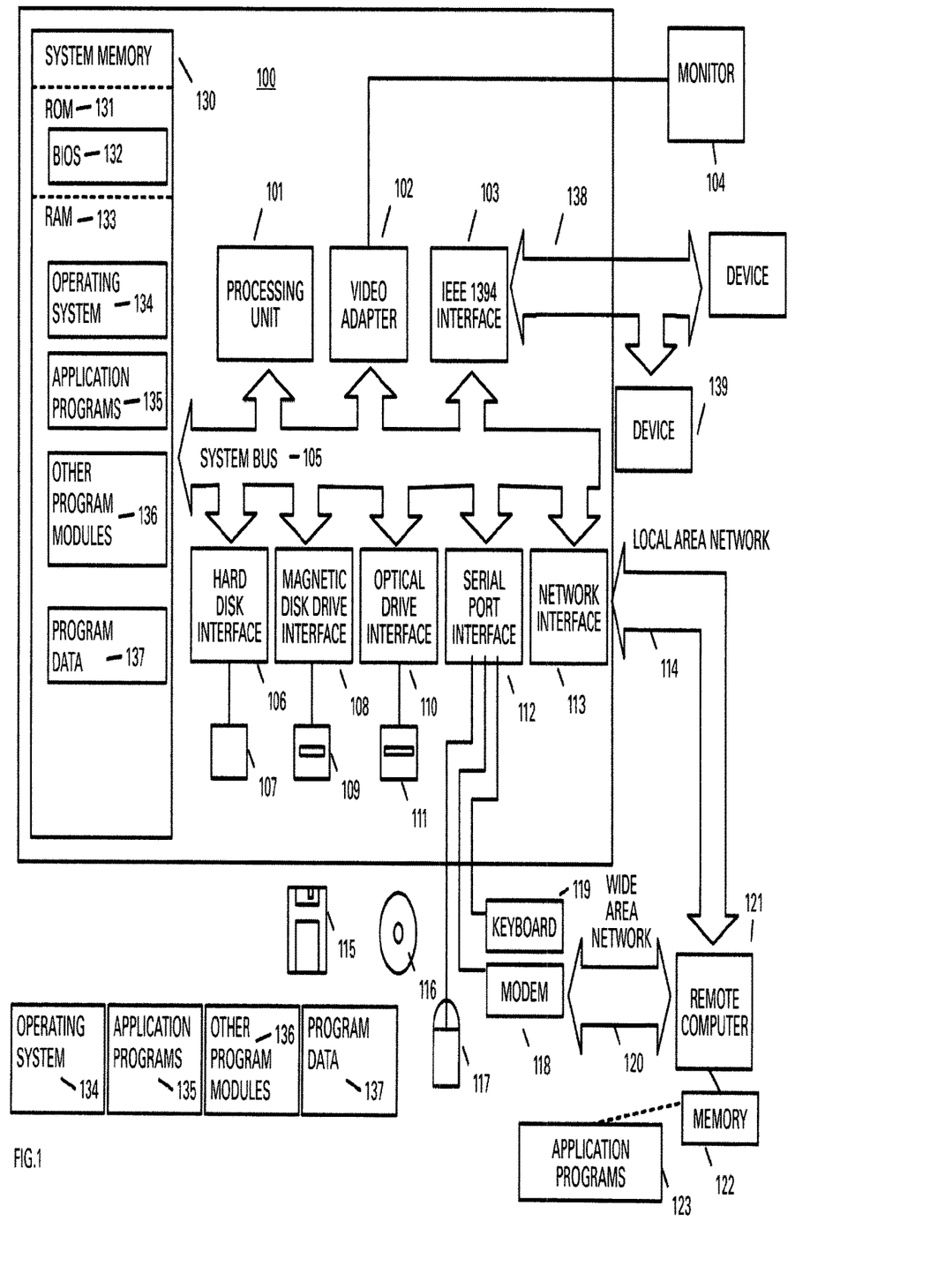
FIG. 1 is a block diagram of an exemplary operating environment.

Example embodiments of the present invention may be more vividly described with reference to FIGS. 1-5. FIG. 1 is a schematic diagram of a conventional digital electronic device that can be used in association with various embodiments of the present invention. The electronic device 100 includes a processing unit 101, a system memory 130 and a system bus 105 that couples various system components including the system memory to the processing unit. System bus may be any of several types of bus structures including a memory bus or memory controller, a peripheral bus, and a local bus using any of a variety of bus architectures. System memory includes a read only memory (ROM) 131 and a random access memory (RAM) 133.

A basic input/output system (BIOS) 132 containing the basic routines that help to transfer information between elements within the electronic device 100, such as during start-up, is stored in ROM 131. The electronic device 100 also includes a hard disk drive 107 for reading from and writing to a hard disk, an optical disk drive 111 of an optical drive interface 110 for reading from or writing to a removable optical disk 116, such as a CD ROM or other optical media and a magnetic disk drive 109 for reading from or writing to a removable magnetic disk 115. Magnetic disk drive 109, Hard disk drive 107 and optical disk drive 111 are respectively connected to the system bus 105 by a magnetic disk drive interface 108, a hard disk drive interface 106 and an optical drive interface 110. The drives and their associated media provide nonvolatile storage of electronic devices readable instructions, data structures, program modules and other data for the electronic device 100.

Of course other types of media readable by electronic devices which can store data that is accessible by an electronic device such as flash memory cards, digital video disks, magnetic cassettes, random access memories (RAMs), read only memories (ROMs), and the like, may also be used in the exemplary environment.

A number of program modules can be stored on the hard disk, magnetic disk 115, optical disk 116, ROM 131 or RAM 133, including an operating system 134, one or more application programs 135 and 123, other program modules 136, and program data 137.

A user can enter commands and information into the electronic device 100 through input or selection devices, such as a keyboard 119 and a pointing device 117. The pointing device 117 may comprise a mouse, touch pad, touch screen, voice control and activation or other similar devices.

These and other input devices are often connected to the processing unit 101 through a serial port interface 112 that is coupled to the system bus, but may be connected by other interfaces, such as a parallel port or a universal serial bus (USB).

A monitor 104 or other type of display device is also connected to system bus 105 via an interface, such as a video adapter 102. In addition to the monitor, electronic devices typically include other peripheral output devices (not shown), such as speakers and microphones.

An additional serial port in the form of an IEEE 1394 interface 103 may also be provided. The IEEE 1394 interface 103 couples an IEEE 1394 compliant serial bus 138 to the system bus 105 or similar communication bus. The IEEE 1394 compliant serial bus 138, as known in the art, allows multiple devices 139 to communicate with the electronic device 100 and each other using high-speed serial channels.

The electronic device 100 can operate in a networked environment using logical connections to one or more remote electronic devices, such as a remote electronic device 121. A remote electronic device 121 typically includes at least some of the elements described above relative to the electronic device 100, although only a memory storage device 122 has been illustrated in FIG. 1. The logical connections depicted in FIG. 1 include a local area network (LAN) 114 and a wide area network (WAN) 120. Such networking environments are commonplace in offices, enterprise-wide computer networks, intranets and the Internet.

When used in a LAN networking environment, the electronic device 100 is connected to a local network 114 through a network interface or adapter 113. When used in a WAN networking environment, local electronic device 100 and remote electronic device 121 may both include a modem 118 or other means for establishing a communications over wide area network 120, such as the Internet. Modem 118, which may be internal or external, is connected to system bus 105 via serial port interface 112.

In a networked environment, program modules depicted relative to the electronic device 100, or portions thereof, may be stored in the remote memory storage device. It will be appreciated that the network connections shown are exemplary and other means of establishing a communications link between the electronic devices can be used. The existence of any of various well-known protocols, such as TCPIIP, "ETHERNET", FTP, HTTP and the like, is presumed, and the system can be operated in a client-server configuration to permit retrieval of web pages from a web-based server. For example, in one example embodiment of the present invention, the remote electronic device 121 is a server having stored thereon one or more files that may be accessed by the local electronic device 100. Procedures of the example embodiments of the present invention described below can operate within the environment of the electronic device shown in FIG. 1.

Figure 2:
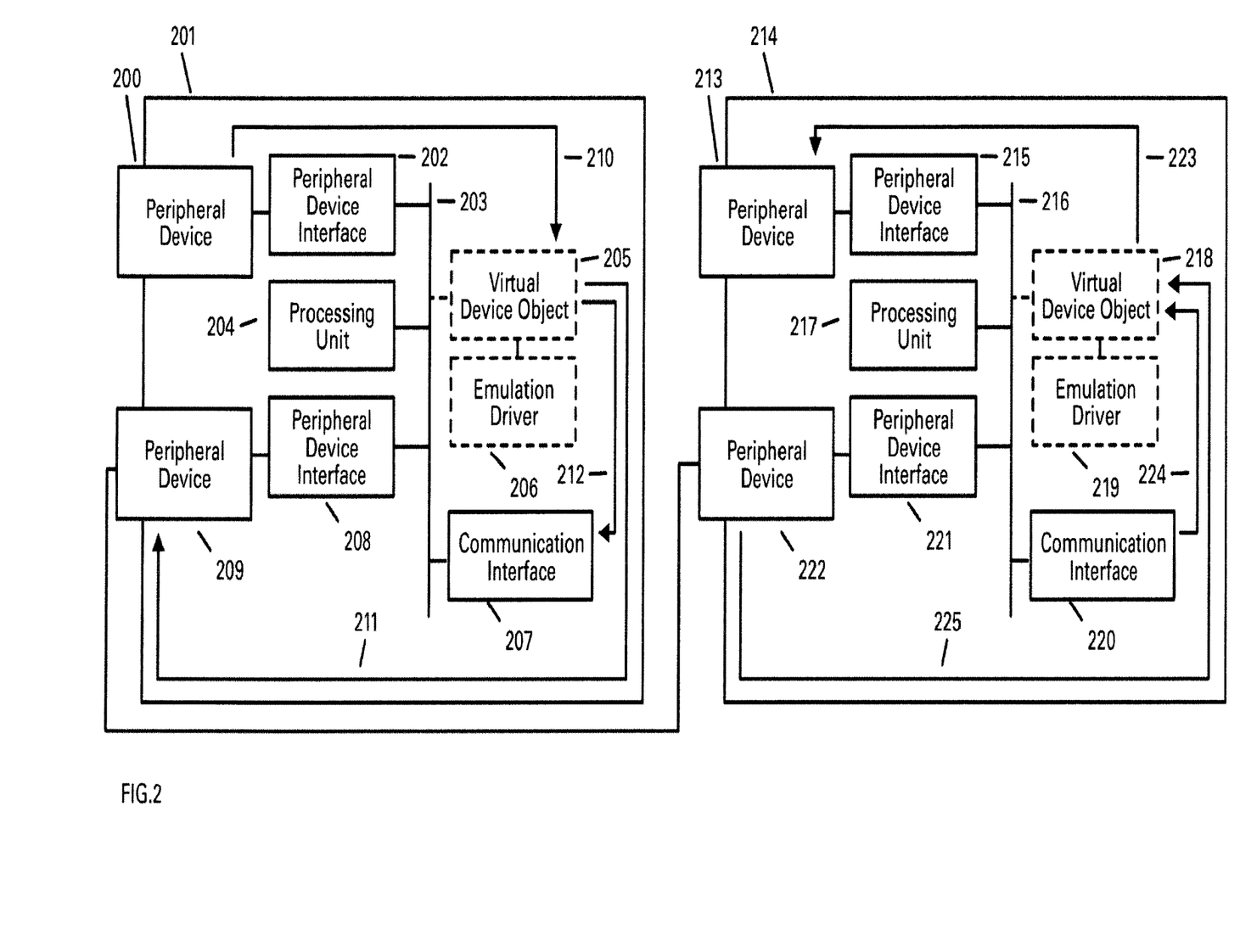
FIG. 2 is a block diagram of a system for transmission of data between electronic devices.

Although the example embodiments of the present invention are generally applicable to an electronic device operating in accordance with the description shown above, the invention is applicable to any electronic device that is able to uniquely identify attached peripheral devices either by a reserved memory area or a unique node id, such as, when using peripheral devices that are attached to a peripheral interface that uses direct memory access control methods. In FIG. 2, there is a system that maybe used in accordance with an example embodiment of the present invention. A peripheral device 200 may be connected to an electronic device 201. The electronic device 201 comprises a peripheral device interface 202, which manages communications between the physical bus 203 and the peripheral device 200. The peripheral device 200 also includes a processing unit 204 coupled to a peripheral device interface 208 connected to another peripheral device 209. The peripheral device 200 has a link 210 to a virtual device object 205 which has a link 212 to a communication interface 207 and another link 211 to the peripheral device 209.

A user of the electronic device 201 has the option of creating a virtual device object 205 that, after completing the remaining operations represents an image of the remote peripheral device 215 plugged into the remote electronic device 214. At creation, the virtual device object loads an emulation driver 206 appropriate for a node of the peripheral bus of the selected local attached peripheral device 200. Similar to the electronic device 201, the remote device 214 includes a peripheral device 213 in communication with a peripheral device interface 216 which is connected to a processing unit 217, another peripheral device interface 221 of another peripheral device 222. A virtual device object 218 has a link 223 to the peripheral device and operated by an emulation driver 219. A communication interface 220 communicates via link 224 to the virtual device object 218, which has a link 225 to the peripheral device 222.

The user may want to emulate more than one device. In this case, the user would repeat the process by creating a second virtual device object based on peripheral device properties of another locally attached device (not shown). The second virtual device object would then load a second emulation driver (not shown). Several virtual device objects 205 can be created and can exist at the same time. One benefit of the present invention is that it instantly allows an electronic device to emulate multiple remote peripheral devices at the same time.

Another example embodiment of the present invention may provide a feature that does not require the remote device or the remote electronic device to be plugged in or connected to create a virtual device object. A user mode application sends a request that tells the electronic device to create a virtual device object with certain peripheral device properties. The virtual device object loads an emulation driver that supports the target functionality of a node of the selected peripheral interface or bus. If the remote electronic device with the remote peripheral device attached to it is connected to the local electronic device the virtual device object is already present and is immediately capable of representing the complete functionality of the peripheral device of the remote electronic device.

Conventionally, the electronic device would not be able to represent to its peripheral bus nodes functionality other than that of a physical device attached to the local peripheral bus.

In accordance with one example embodiment of the present invention, the device 200 is assumed to be a mass storage node attached to an IEEE 1394 bus. The electronic device 200 would have a device driver (USB mass storage device driver) that enables communication with the device 200. The user can create a virtual device object 205 that represents an additional member of the peripheral device class of the peripheral device 200 even though the device is not attached to the local electronic device.

At the local electronic device a virtual device object may be created by modifying the installation files of the peripheral device 200. When an IEEE 1394 bus node is detected, an additional virtual device entry is automatically created in the registry. The virtual device object 205 uses an emulation driver 206 for communication with the device 200.

In addition to being able to emulate multiple peripheral devices at one time and not requiring that a device be plugged in to emulate the device, another example embodiment of the present invention permits "native" communication between physical existent and virtual devices across a peripheral bus. In the previous example, the peripheral device 200 can communicate using "native" language because it believes it is communicating with a node of the local peripheral bus instead of a remote electronic device. In the present example embodiment of the present invention no translations are necessary because the peripheral device 200 communicates directly with the virtual device object 205.

Figure 3:
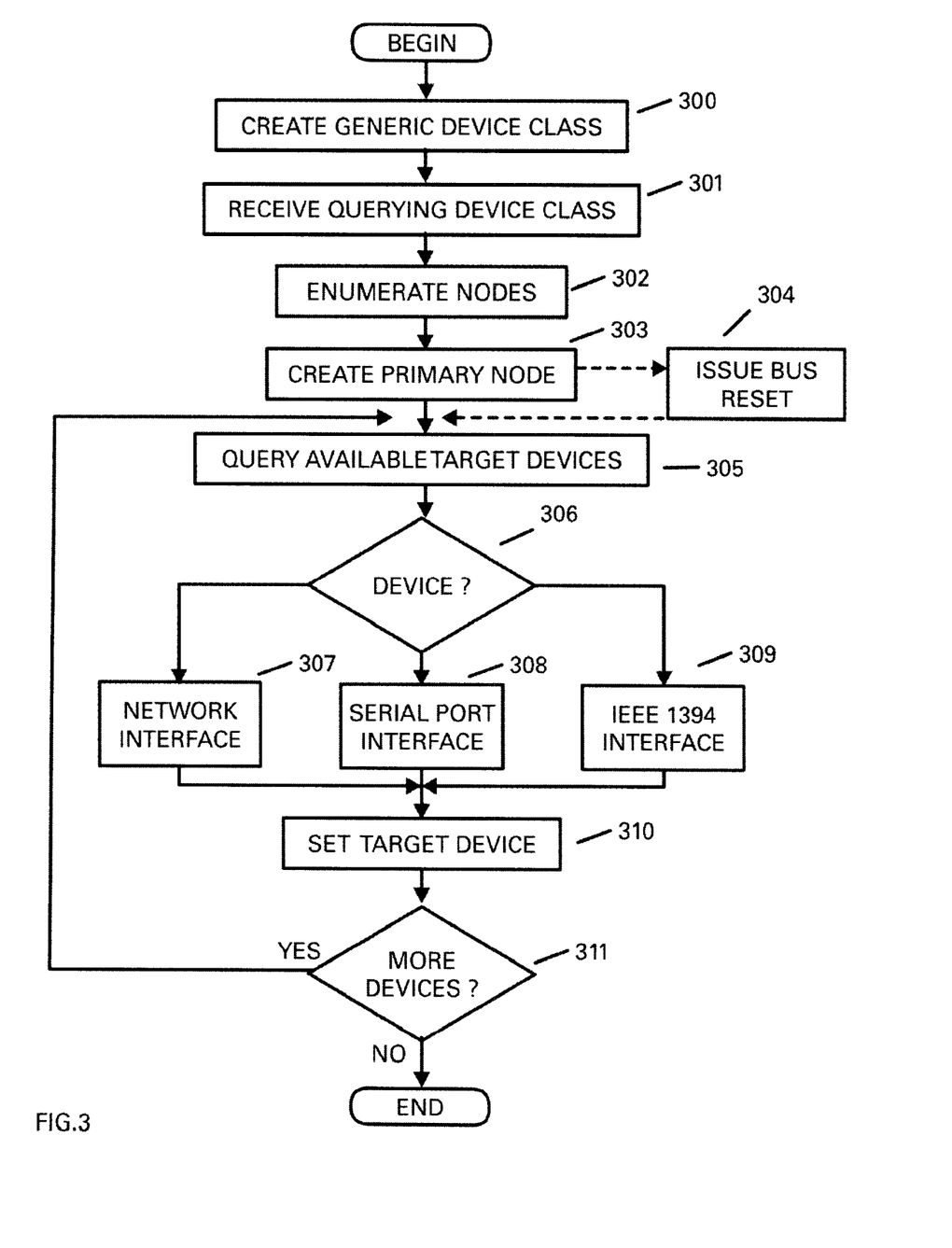
FIG. 3 is a flow chart illustrating a method of creating a virtual device in accordance with the present invention.

In FIG. 3, a method of creating a virtual device is shown, according to an example embodiment of the present invention. At operation 300 a generic virtual device object is created by the operating system of the electronic device that may be initialized by the existent peripheral device itself that sends its peripheral device properties. After the querying device class is received 301 the peripheral devices attached to the peripheral interface or bus are enumerated 302. In case of a peripheral interface like the serial port interface enumeration is done by the operating system followed by the creation of a new primary node 303. In case of a node of a 1394 bus the driver enumerates the existent nodes by reading the nodes from the control status register and then adds a new node by assigning a node id and writing the appropriate information's to the CSR. In such case the driver issues a reset 304 of the peripheral bus to allow the nodes an enumeration of the new device.

After setup of the primary node the second binding of the virtual device is set. This requires querying available target devices 305. Such an operation may either be done by the user or by using a predefined setup file that automatically selects from available communication interfaces 207 or peripheral devices that may be connected to a remote electronic device. After querying the available devices a device can be selected 306 from a list of available interfaces like for example a network interface 307 a serial port interface 308 or an IEEE 1394 interface 309 and be set 310 as the primary target device.

After the primary target device is selected additional secondary devices may be selected 311 to guarantee error free communication even if the primary device fails. This process can be repeated several times for each device the electronic device should use. In case of using the method to emulate a node of a serial bus a bus reset can be forced after the device object's exposition. This bus reset causes all devices or nodes attached to the serial bus to enumerate each other. Any other node may now see the new node, the device chosen to emulate.

The method of creating a virtual device as shown in the example embodiment of FIG. 3 can also be initialized by a request in the form of a data structure that is sent to the application program interface (API). The request to generate an additional node can be sent by an upper level driver that is already loaded for an IEEE 1394 device. The request could also be sent by an application upon user request. Using a request to the 1394 bus driver software can pass a data structure that causes the bus driver itself to add a virtual device and to fill in the data structure required for the device. By setting an instance ID for the device the instance of the device can be identified.

For enumeration of the emulation driver a string may be passed to the driver that is used to generate the PnP ID's. To allow a virtual device on an IEEE 1394 bus to remain present despite a subsequent hardware or software reboot it may be necessary to pass a flag to the driver that keeps the device's state persistent. This will provide the virtual device object to be reported as existent after a reboot. The electronic devices operating system believes the emulated device is present. In other words, the electronic devices operating system can then "see" the emulated device.

Allowing the emulated device to be seen allows any other node on the bus to communicate "natively" with the device rather than using an additional node that performs as a server/translator between the devices. Generally, virtual device objects and the respective drivers have the same access to the driver of the peripheral bus as would a physical device object and its respective driver.

Because there is no physical target device there are differences in behavior with a virtual device object because there is no physical target device. Normally the peripheral bus driver fills in the target node identifier and the appropriate packet size and transfer rate using information from the enumeration procedure with a particular device. Due to the fact that there is no physical device the virtual device object has to provide all packet information because there is no target device node. For example, a read/write request will be intercepted and the virtual device object will fill in the address information for the request. The bus driver does not overwrite any fields.

A request for allocation of a range exhibits different behavior if addressed to a virtual device object. All address allocations from an emulation driver will implicitly have the flag to broadcast access enabled if post notification on the address range is required. This is done to allow any external node to access the address range used by the emulation driver to simulate the device.

Figure 4:
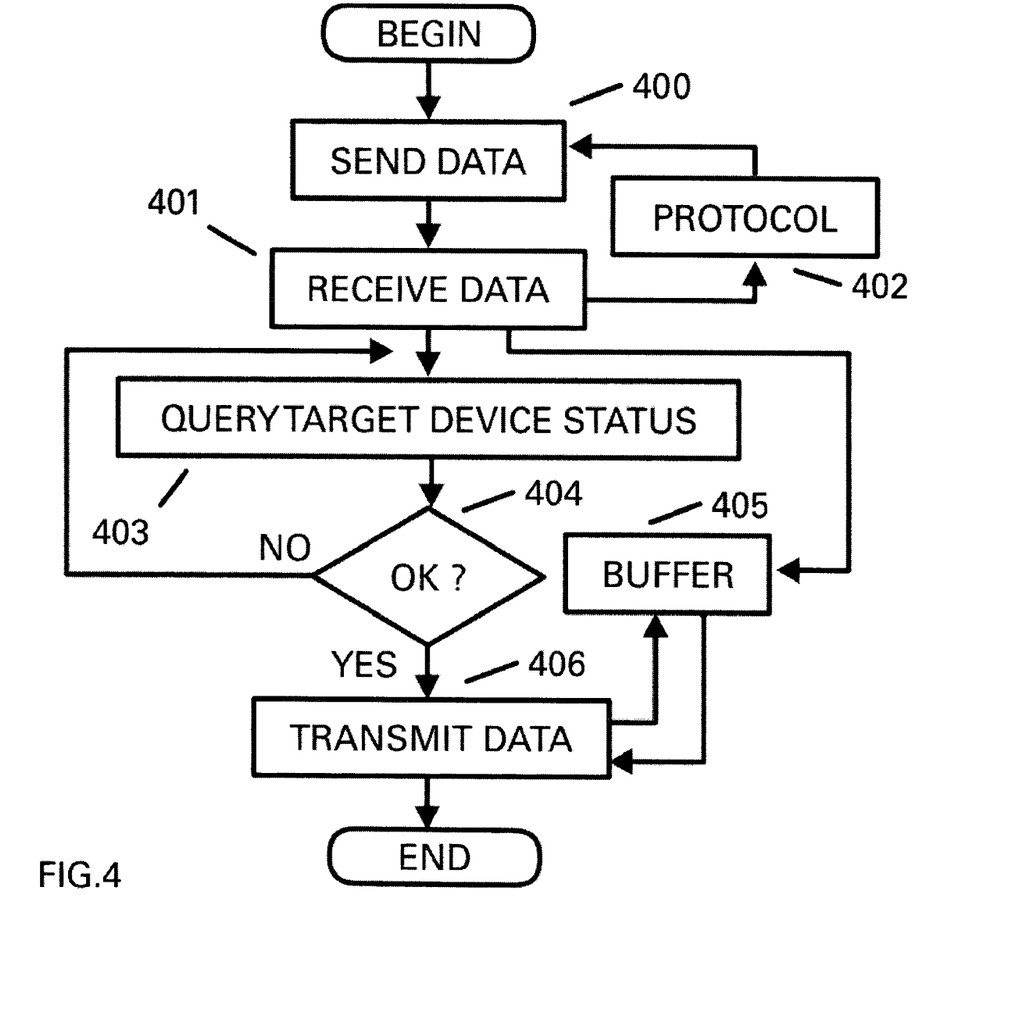
FIG. 4 is a flow chart illustrating a method of transmission of data from a peripheral device in accordance with the present invention.

In FIG. 4, according to an example embodiment of the present invention, a method of transmission of data from a peripheral device in accordance with the present invention is shown. Data 400 sent by the physical existent peripheral device to the virtual device object is received by the virtual device 401. As the virtual device object was generated based on descriptive information of the sending device the exchange of necessary protocol status information 402 may be provided by the virtual device object. Upon reception 401 of data from the peripheral device the virtual device object queries 403 the primary transport device and checks if the device is available for data transport. In case of a serial device this may be done by simply checking the status of the signal levels of the transmission and reception lines. Handshake lines, if any, may also be checked.

As the virtual device object's operation will reduce the likelihood of communication outages and failures, it will therefore report a successful state to the sending peripheral device. While checking the target device status 404 the incoming payload data may be stored in a buffer 405. This buffer may either be located in the RAM of the electronic device or in any kind of mass storage device attached to the electronic device, and may be accessed to transmit data 406.

The virtual device object may also use a combination of volatile memory, such as, RAM and mass storage memory, for example, if the incoming payload data exceeds a certain amount of mass storage memory that is used instead of the RAM. The virtual device object may also be configured to buffer the data according to the speed of the target device. The speed of the target device can be detected by measuring by comparing the time for filling up the initial buffer by the incoming data with the time the data is read by the target device. It is even possible to configure an algorithm that automatically sets the amount of buffer for the device based on the different speeds of the devices. Such an algorithm may also automatically decide about the location for storage of buffered data, either in volatile or non volatile memory.

As indicated above, the virtual device object will report the successful reception of data in a timely fashion to the sending device. By reporting successful reception, the sending device may avoid reporting unnecessary errors or warnings. If the virtual device object detects that the primary target device is finally not available, it restarts the operation of querying the target device status by querying the secondary target device.

The incoming payload data is buffered and there is no loss of any data. Upon a successful query of the target device the virtual device object transmits the data to the target. As data may arrive at the remote electronic device from various communication interfaces or peripheral device connections it may be necessary to properly identify the incoming data source by the receiving electronic device. Such an operation may be provided by the virtual device object in various ways.

The virtual device object may add its unique node id in the form of an identification string that may either be in plain text or, for binary data, in the form of a binary pattern. Due to the fact that this data is never directly received by the peripheral device at the remote electronic device this does not lead to any reception errors at the remote peripheral device.

If a communication interface in form of a network interface card is used, unique identification of the source data can also be provided by adding identification information, such as, a number or a single flag to the data exchange protocol used by the communication interface. When using a network interface as the communication media, a fixed communication port, or a range of ports can be defined that allow identification by the receiving device.

Figure 5:
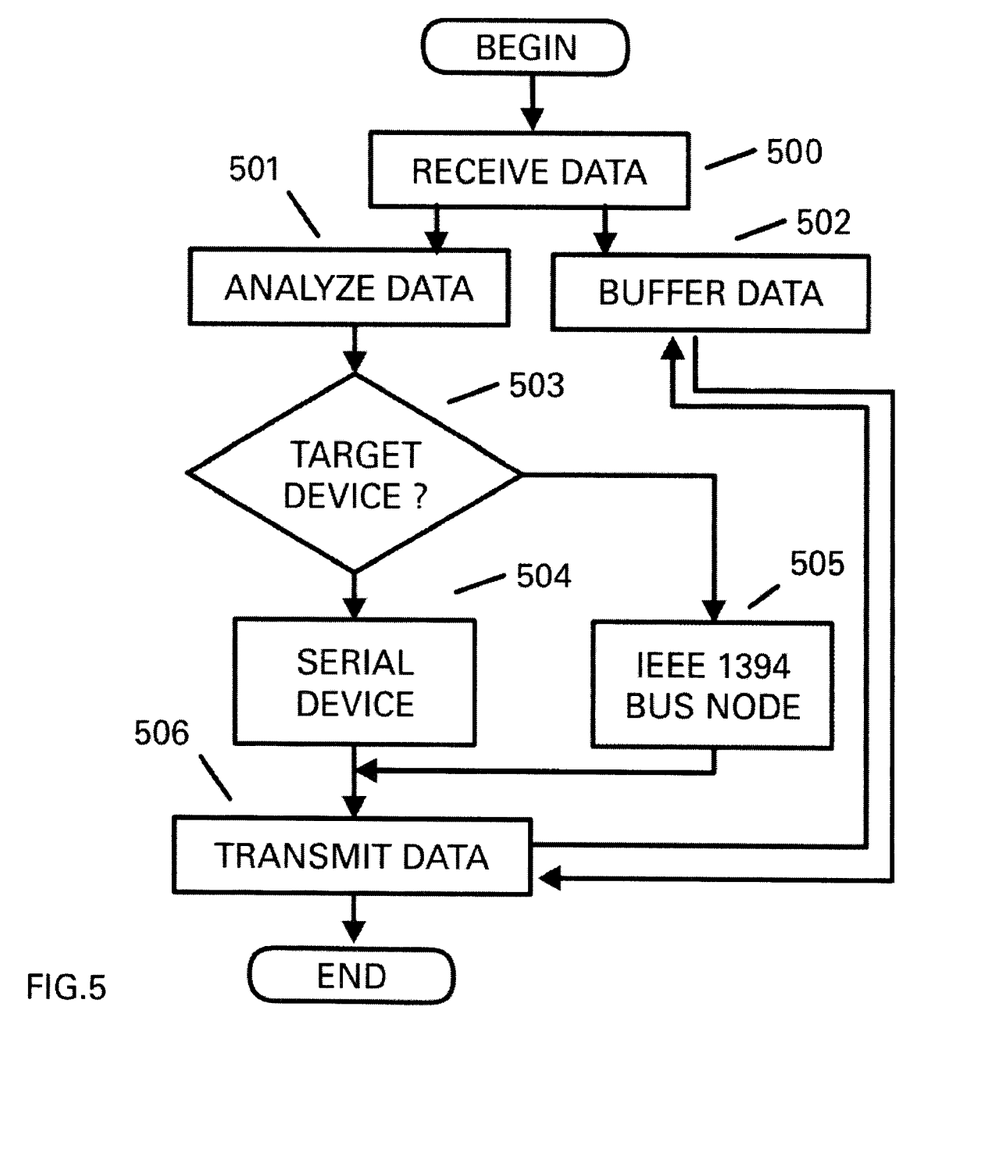
FIG. 5 is a flow chart illustrating a method of reception of data by a device in accordance with the present invention.

FIG. 5. shows a method of reception of data 500 by a device in accordance with an example embodiment of the present invention. As previously described, data from a specific peripheral device may arrive at the receiving electronic device from multiple devices having either communication interfaces or peripheral connections, such as, cables or WIFI connections. To guarantee exact identification of the incoming data, the virtual device object at the receiving electronic device will analyze 501 the incoming data. Based on the analyzed data, a target device 503 is chosen to transmit the data which includes a serial device 504 or an IEEE 1394 bus node 505.

The architecture of the virtual device object used at the receiving device is similar to the architecture of the sending device. As described in FIG. 3, the virtual device object may be based on a generic device object that is able to create a peripheral device or bus bindings by querying existent peripheral device classes of the device. If the addressed peripheral device at the receiving electronic device is a member of the same peripheral device class as the peripheral device at the sending electronic device, the virtual device object installed at the sending electronic device may be installed from a setup file generated by the initial device.

As shown in FIG. 3, the virtual device object may create multiple bindings. The first operation is to enumerate the existent device classes on the electronic device. At this device, the primary node is the target for the desired data transfer. The primary node may be automatically assigned by the virtual device object or manually selected from a list of available peripheral devices from the user. Because there is no need for creation of additional new bus nodes or new virtual peripheral devices, a bus reset, after enumeration of the existent nodes on the target bus, is not necessary.

As described in FIG. 3, it is necessary to select at least one communication interface or peripheral device at the virtual device object to inform the virtual device object about possible interfaces for incoming data. When installing the virtual device object on the target electronic device it may be necessary to use the existent setup information of the sending device to guarantee that the unique node id transmitted by the sender provides incoming data to the desired peripheral device.

Since data may arrive from various interfaces the virtual device object's primary task is to analyze the incoming data for the node id specified in the virtual device object. As this may take some time, the virtual device object writes the incoming data to a buffer 502 that may be built up, according the example embodiments described above. If the virtual device object has finished the analysis of the data it removes the identification data and transmits 506 the payload data to the targeted device.

For most requests, the behavior is the same between virtual and physical devices. Although the invention has been described in relation to preferred embodiments, many variations, equivalents, modifications and other uses will become apparent to those skilled in the art. The scope of the present invention should not be limited to the specific disclosure but determined only by the appended claims.

What is claimed is:

1. A method, comprising:
    transmitting data designated for a remote peripheral device to a local virtual device object, the data received by the local virtual device object is transmitted via at least one of a communication interface and a peripheral device of an electronic device to at least one of a remote communication interface and the remote peripheral device of a remote electronic device, the local virtual device object operating on the electronic device and emulating the remote peripheral device of the remote electronic device;
    analyzing by the local virtual device object of the incoming data for a node id specified in the local virtual device object;
    buffering the data at a buffer at the local virtual device object, wherein an algorithm is configured to automatically set the amount of buffer for the local virtual device object based on the different speeds of the peripheral device, such speed can be detected by comparing the time for filling up the initial buffer by the incoming data with the time the data is read by the peripheral device, further wherein the algorithm automatically decides the location of stored buffered data, either in volatile or non-volatile memory;
    receiving by a remote virtual device object the data designated for the at least one of the remote communication interface and the peripheral device of the remote electronic device;
    querying the remote peripheral device via the local virtual device object to determine the remote peripheral device is available to receive data, wherein if the virtual device object detects that the remote peripheral device is not available, a secondary remote peripheral device is queried; and
    transmitting the data to the designated remote peripheral device.

2. The method of claim 1, wherein the designated remote peripheral device is identified by payload data received.

3. The method of claim 1, wherein the designated remote peripheral device is identified by a content of a communication protocol of the communication interface.

4. The method of claim 1, wherein at least one communication interface or peripheral device of the electronic device uses an asynchronous communication standard.

5. The method of claim 1, wherein at least one communication interface or peripheral device of the electronic device uses a synchronous communication standard.

6. The method of claim 1, wherein the peripheral device of the electronic device is connected to a peripheral bus.

7. The method of claim 1, comprising receiving a request at the electronic device to create the local virtual device object comprising properties of the remote peripheral device.

8. The method of claim 1, comprising transmitting a report message from the local virtual device object to the electronic device indicating the successful reception of data at the local virtual device object.

9. The method of claim 1, and wherein a buffer size of the buffer dynamically adjusts according to a transfer speed of the peripheral device that transmits the data, wherein the buffer size dynamically increases or decreases according to the transfer speed of the communication interface or the peripheral device used for data transmission by the electronic device.

10. An apparatus, comprising:
    a transmitter configured to transmit data designated for a remote peripheral device to a local virtual device object, the data received by the local virtual device object is transmitted via at least one of a communication interface and a peripheral device of an electronic device to at least one of a remote communication interface and the remote peripheral device of a remote electronic device, wherein the local virtual device object operates on the electronic device and emulates the remote peripheral device of the remote electronic device;
    an analyzer configured to analyze the incoming data to the local virtual device object for a node id specified in the local virtual device object;
    a buffer configured to buffer the data at the local virtual device object, wherein an algorithm is configured to automatically set the amount of buffer for the local virtual device object based on the different speeds of the peripheral device, such speed can be detected by comparing the time for filling up the initial buffer by the incoming data with the time the data is read by the peripheral device, further wherein the algorithm automatically decides the location of stored buffered data, either in volatile or non-volatile memory;
    wherein the transmitter transmits a query to the remote peripheral device via the local virtual device object to determine the remote peripheral device is available to receive data, wherein if the virtual device object detects that the remote peripheral device is not available, a secondary remote peripheral device is queried; and
    wherein the data is transmitted to the at least one of the remote communication interface and the remote peripheral device of the remote electronic device, and is received by a remote virtual device object which transmits the data to the designated remote peripheral device.

11. The apparatus of claim 10, wherein the designated remote peripheral device is identified by payload data received.

12. The apparatus of claim 10, wherein the designated remote peripheral device is identified by a content of a communication protocol of the communication interface.

13. The apparatus of claim 10, wherein at least one communication interface or peripheral device of the apparatus uses an asynchronous communication standard.

14. The apparatus of claim 10, wherein at least one communication interface or peripheral device of the apparatus uses a synchronous communication standard.

15. The apparatus of claim 10, wherein the peripheral device of the apparatus is connected to a peripheral bus.

16. The apparatus of claim 10 comprising a receiver configured to receive a request to create a local virtual device object comprising properties of the remote peripheral device, wherein the receiver receives a query response indicating the query was successful.

17. The apparatus of claim 10, wherein a report message is transmitted indicating the successful reception of the data at the local virtual device object.

18. The apparatus of claim 10, wherein a buffer size of the buffer dynamically adjusts according to a transfer speed of the peripheral device that transmits the data, wherein the buffer size dynamically increases or decreases according to the transfer speed of the communication interface or the peripheral device used for data transmission by the apparatus.

19. A non-transitory computer readable storage medium configured to store a computer program that when executed by a processor causes the processor to perform:

transmitting data designated for a remote peripheral device to a local virtual device object, the data received by the local virtual device object is transmitted via at least one of a communication interface and a peripheral device of an electronic device to at least one of a remote communication interface and the remote peripheral device of a remote electronic device, the local virtual device object operating on the electronic device and emulating the remote peripheral device of the remote electronic device;

analyzing by the local virtual device object of the incoming data for a node id specified in the local virtual device object;

buffering the data at a buffer at the local virtual device object, wherein an algorithm is configured to automatically set the amount of buffer for the local virtual device object based on the different speeds of the peripheral device, such speed can be detected by comparing the time for filling up the initial buffer by the incoming data with the time the data is read by the peripheral device, further wherein the algorithm automatically decides the location of stored buffered data, either in volatile or non-volatile memory;

receiving by a remote virtual device object the data designated from the at least one of the remote communication interface and the peripheral device of the remote electronic device;

querying the remote peripheral device via the local virtual device object to determine the remote peripheral device is available to receive data, wherein if the virtual device object detects that the remote peripheral device is not available, a secondary remote peripheral device is queried; and transmitting the data to the designated remote peripheral device.

20. The non-transitory computer readable storage medium of claim 19, wherein the buffer size dynamically increases or decreases according to the transfer speed of the communication interface or the peripheral device used for data transmission by the electronic device.

\* \* \* \* \*